United States Patent [19]

Coggins

[11] 3,960,525
[45] June 1, 1976

[54] OIL-GAS SEPARATOR HAVING DEFOAMING STRUCTURE

[75] Inventor: Robert W. Coggins, Tulsa, Okla.

[73] Assignee: Combustion Engineering, Inc., Windsor, Conn.

[22] Filed: May 9, 1975

[21] Appl. No.: 575,914

[52] U.S. Cl. .............................. 55/178; 55/87; 55/320; 55/327; 55/512
[51] Int. Cl.² ................................... B01D 19/02
[58] Field of Search ........ 55/169, 87, 159, 171–178, 55/320, 327, 418, 512

[56] References Cited
UNITED STATES PATENTS

| | | | |
|---|---|---|---|
| 1,775,362 | 9/1930 | Demarcus | 55/170 |
| 2,518,845 | 8/1950 | Williams | 55/178 |
| 2,710,071 | 6/1955 | Kinser et al. | 55/176 |
| 3,212,234 | 10/1965 | McMinn | 55/177 |
| 3,266,787 | 8/1966 | Eckert | 261/94 |
| 3,385,031 | 5/1968 | McMinn | 55/174 |
| 3,775,947 | 12/1973 | Dupont et al. | 55/159 |
| 3,791,105 | 2/1974 | Rhodes | 55/512 |

Primary Examiner—Bernard Nozick
Attorney, Agent, or Firm—Arthur L. Wade

[57] ABSTRACT

A separator vessel shell is connected to receive a mixture of fluids produced from an oil well. An inlet structure is mounted within the shell and positioned to receive the flow stream of fluid mixture. The inlet structure includes a matrix of units, each of which provide a large surface area over which the fluid mixture passes in flowing through the matrix. The forces generated on the fluid mixture convert the energy in the flowing mixture and prevent the energy from shearing vapor bubbles in the mixture and forming additional foam.

2 Claims, 3 Drawing Figures

OIL-GAS SEPARATOR HAVING DEFOAMING STRUCTURE

BACKGROUND OF THE INVENTION

1. Field of the Invention

The present invention relates to structures at the inlet of fluid the which absorb energy from the stream of fluids and give the first direction of the flow streams into paths for separation of the fluids from each other. More particularly, the present invention relates to inlet structure which provides a large, complex surface over which liquids containing a large amount of gas will flow without the generation of a large amount of foam with the gas and liquid.

2. Description of the Prior Art

If a separator vessel receives a fluid mixture with a high ratio of gas to liquid, the gas may form a foam with the liquid which will readily carry over to the gas outlet of the vessel. There are many factors which set the quantity and quality of the foam. But, in the final analysis, if the foam is formed, and is carried to the gas outlet, the discharge of the liquid of the foam is termed "failure" of the separator at a predetermined quantity of the liquid.

Foam in Middle East production was discussed to a great extent in the January 1964 article in the IP Review by J. D. Lowd of National Tank Company from his extensive experience with production problems in the Middle East. The sole concession to foam prevention was reference to minimizing turbulence and elimination of re-entrainment of separated phases into each other. The extension of this concept was recognition that as the fluids left the flow line and entered the vessel for separation the "inertia effects" must be quickly and effectively overcome. A carefully designed and compact device was desired to give controlled directional deceleration of the incoming fluids. Evidently, reduction of turbulence would be desired at this point.

All the problems of created foam were touched upon in the Lowd analysis. However, most of the article stepped around the foam reduction problem to study hydraulic radius control for liquid droplet removal from the otherwise separated gas stream. There remains to this day, 12 years later, the problem of effective foam prevention at the inlet separator by mechanical structure.

The oil well fluids arrive at the separator vessel as a mixture. The fluid mixture has a large store of flowing energy. The pressure upon the fluids is being reduced. The flowing energy must be absorbed to large extent. What gas is to be released from the liquids is to be released so that relatively small amounts of foam are formed. Relatively little turbulence must be introduced into the flowing stream. To carry out these functions at the inlet to the separator, a mechanical structure, or unit, must be provided.

SUMMARY OF THE INVENTION

A principle object of the invention is absorb the flowing energy of a stream of mixed fluid as the stream is received in a vessel for separation.

Another object is to flow the mixed fluid stream over a large surface so as to impart only a small degree of turbulence, the liquid component of the mixture gravitating to a low level and any gas released ascending to a higher level, the amount of foam generated being kept to a minimum.

The invention is embodied in a system for receiving a fluid stream of a mixture of fluids, the system including a vessel connected to a source of the fluid mixture, an inlet structure mounted within the vessel and comprising a number of multi-surfaced units held in a body so the fluid mixture will be discharged through the matrix of multi-surfaced units. The units are held in a body so as to provide a total surface area over which the fluid mixture will flow and contain the bubbles in the mixture to convert the flowing energy into heat and prevent shearing the bubbles to form additional foam.

Other objects, advantages and features of this invention will become apparent to one skilled in the art upon consideration of the written specification, appended claims, and attached drawings, wherein;

DESCRIPTION OF THE PREFERRED EMBODIMENT

Figure 1:
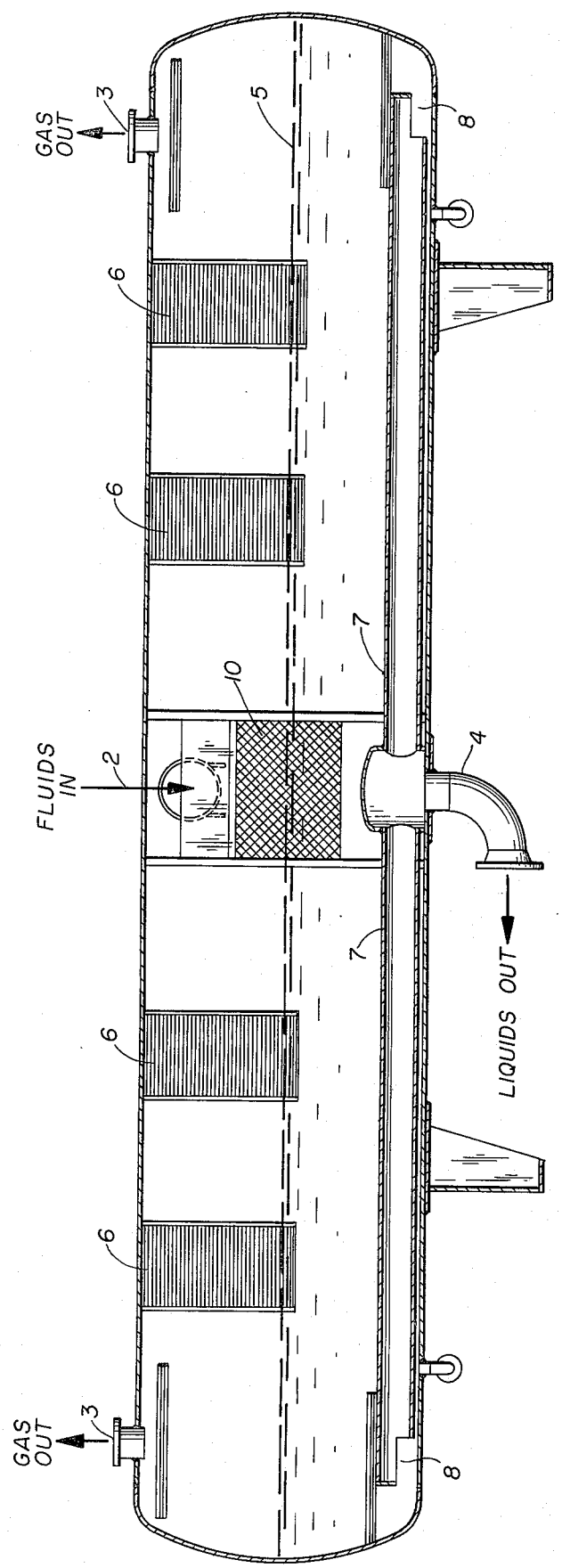
FIG. 1 is the sectioned elevation of the horizontal shell of an oil and gas separator with an inlet structure in which the present invention is embodied.

Long after the oil crisis, when the supply of oil imported to the United States from the Middle East was stopped, dependence of the U.S. on this oil continues. While vulnerable to future import hold-up, the U.S. equipment manufacturer supplies, and works with, the Middle East oil producer.

Diplomatic relations do not exist between Iraq and the U.S. As a matter of fact, the Soviet Union is supplying arms and military assistance to Iraq. Nevertheless, Combustion Engineering, Inc., through its division, National Tank Company (C-E Natco) sold four oil and gas separator installations to Basrah Petroleum in 1973 for its Rumaila Field in Southern Iraq. The four stations in this field are:

| | |
|---|---|
| Qurainat | 160,000 bbl/day |
| Shamiyah | 225,000 bbl/day |
| Janubia | 260,000 bbl/day |
| Rumaila | two trains of 175,000 bbl/day each |

At the total of 995,000 bbl/day, at the present market price about $10/barrel, the $9.95 million/day or $3.63 billion/year brings potential financial ramifications of any improper operation in this field into sharp focus. Undoubtedly other phases of the operation of this field have faltered, but C-E Natco was suddenly faced with a specific problem which generated the present invention.

To become more specific about the problem which surfaced, the C-E Natco separators which went into operation late in 1973 were found to be capable of passing only 60% of their rated capacity. Above that limit, liquid carried over to the gas flares and generated an umbrella of black smoke the size of which could only be guessed. Apparently the particular oil at these four stations was foaming badly in the separator vessels. This foam was readily swept to the gas outlets of the vessels and swept along with the gas in liquid form.

Historically, there are prior trains of National Tank Company separators in he Rumaila Field. These separators have been operating at above their capacity ratings for several years. Chemicals have been injected into the produced fluids upstream of the separators to control the surface tension of the liquids. Foam has been avoided in the separators as their capacity ratings have been exceeded. However, the Iraq purchasing authority for the present separators insists they meet their capacity ratings without the use of chemical. Some new form of inlet had to be developed for the present separators, which inlet will dramatically prevent foam generation.

The potential of chemical anti-foam treatment was fully explored. The effectiveness of compounds used in the past was confirmed and other compounds calibrated. But the immediate inlet configuration and mechanical defoaming development received most of the attention. The result was the present invention.

The present invention is disclosed as embodied in inlet structure mounted within a horizontally extended separator shell. Also, the present invention could be said to be disclosed as embodied in a separator in which inlet structure is mounted. In either event, the essential structure embodying the invention is mounted in the separator shell to form a path, or conduit, for the liquids flowing into the shell and down to combine, or join, the collection of liquids in the bottom of the shell.

In FIG. 1, a separator shell 1 is disclosed. The specific form selected for the disclosure is that built for Basra. As in Basra, the shell 1 has its inlet 2 for the fluid mixture connected to the center of the horizontal shell. The fluids flow to each end of shell 1, hopefully after even division at the inlet. Two outlets 3 are provided for gas. A single, central outlet 4 is provided for liquids, separated from the gas.

The liquids which separate and collect in the lower portion of shell 1 form a level at 5. Normally a simple detecting device, such as a float, can sense the level 5 and put out a control signal for a valve which will control the level. In the present system, a valve is not shown but is assumed to be in outlet 4 and the level signal connected to the valve to keep the level 5 within a desired range.

It is of no particular significance to disclosure of the invention that the inlet 2 is connected to the shell 1 at its midpoint. This happened to be the design of the separators at Basra. The inlet structure receiving the incoming fluids was a centrifugal device which spun the fluids. The opinion of many engineers observing the unit in operation was that the centrifugal inlet device generated the foam which caused the carryover problem now solved by the present invention. In all events, this form of separator is used in this disclosure to embody the invention which solved the foam problem. The fluids enter the separator centrally and divide to flow toward the outlets at each end of the shell 1. The liquids are expected to sink to the lower portion of the shell 1 to form level 5. The gas is expected to disengage from the liquids and flow along the upper portion of the shell 1.

Units 6 represent any of a number of baffle structures which scrub liquids which continue to be entrained in the gas. There is no connection with the invention, but it is expected that some form of baffle structure will be made available in the upper, gas section of the shell 1 to collect liquids carried along with the gas as it flows from the inlet 2. Of course, at Basra, this neat plan was upset by the tendency of the produced oil to foam, and foam badly. These units 6 did nothing to reduce this foam and it reached gas outlets 3 well below the expected capacity of fluid throughput.

To complete the arrangement of the FIG. 1 separator, note that the liquids are removed through a single manifold pipe 7 from openings 8 at each end of pipe 7, beneath gas outlets 3. Outlet 4 is connected to the middle of this pipe 7 to remove all the liquids separated from the gas. Unnumbered plates, horizontally extended, are placed over the outlets to prevent the formation of any vortex which would apply force in the direction to draw liquids out of the gas outlets.

This setting for the invention is elementary. Separators, be they horizontal, vertical or spherical, can be first described as large volumes in a flow line for mixtures, in which residence time is provided for separation of at least the gaseous phase from the liquid phase. It could be said that the present problem surfaced when this more or less conventional separator received a mixture of gas and oil which had what can only be termed "foaming" characteristics.

It was the production into stations Q, S, J and R of the Rumaila Field that gave the unpleasant surprise of excessive foam. The centrifugal inlet design of these separators evidently stimulated more foam. Perhaps this centrifugal form of turbulence enforced the inherent tendency of the production to foam.

Specifically, the Basra crude is a 34.1° API gravity with viscosities of 55 SSU at 68°F. and 46 SSU at 100°F. with a high gas-oil ratio. Production temperature is 160°F. with a pressure of 600 pounds. Mechanical agitation, pressure drop, etc. evidently aggravates the problem — causes more foam to develop. The addition of an antifoam agent to the oil was thoroughly investigated with good progress. However, the problem remained of how to reduce the problem mechanically. This problem the present invention solved.

The mechanical solution of the foaming problem lies in the generation of a force to oppose that of the flowing energy of the fluids into the separator through their inlet. This energy of the flowing fluids can be said to be absorbed, or converted into heat. In any event, it is prevented from shearing the gaseous bubbles of the mixture and thereby generating additional foam. The required force is brought into play by a porous body formed of small multi-surfaced units through which the incoming fluids are directed and over whose total surface the fluids flow.

In FIG. 1, the surface structure which produces the desired result is indicated at 10. This unit is mounted below the inlet so it will receive the mixture of fluids as soon as it enters the separator shell. As the fluids flow over the surfaces provided by the structure 10 their flowing energy is absorbed, or converted, the gas starts its separation and the liquids are conducted into a body in the lower part of the shell without the high degree of foaming which caused the Basra separators to fail below their capacity ratings.

Figure 2:
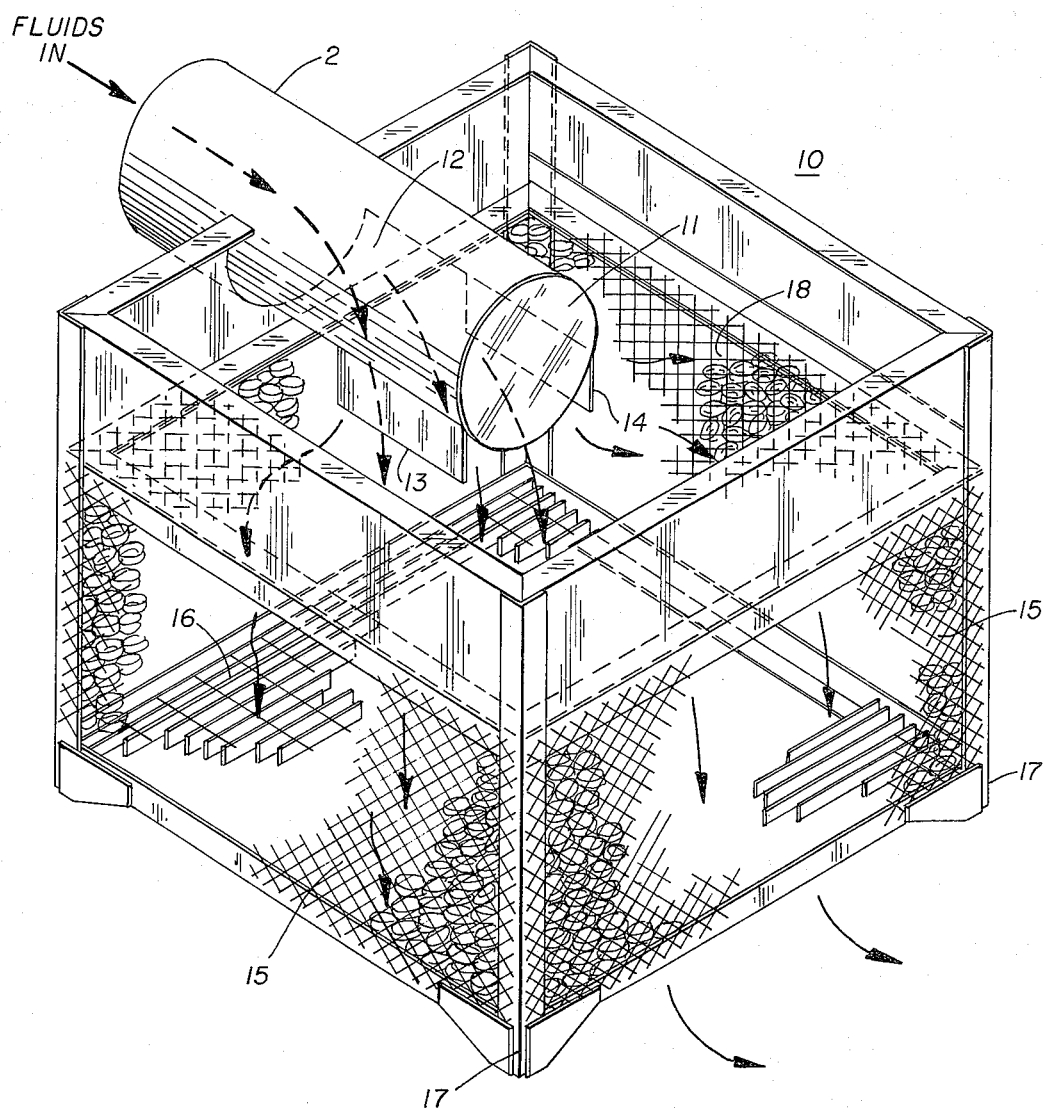
FIG. 2 is a perspective of a framework mounted within the shell of a separator vessel and below the inlet conduit to hold a number of Pall Rings where the incoming fluids will flow down over the Pall Rings in an embodiment of the present invention.

In FIG. 2, unit 10 is shown in good detail, mounted on the inlet 2 so as to receive the fluid mixture. "Receive" is certainly a broad description of function and more detail is required. First, note the unit 10 is mounted below the inlet 2. It is at, or close to, the bottom of the separator shell 1. Therefore, the liquids of the fluid mixture are diverted down into unit 10.

The end of inlet 2 is closed. Plate 11 is welded over the end conduit. Opening 12 is formed in the underside of the conduit end. Further, lips 13, 14 are mounted at the sides of opening 12 to depend down and form a sort of nozzle structure to direct the fluids downward. Many specific shapes can be given this diverting, directing, nozzle structure. Whatever the specific structure, it should function to divert the flow of fluids toward the unit 10, let the free gas which will readily disengage from the liquid flow up and away from the unit 10 and guide the liquids into immediate engagement with the surfaces provided by unit 10.

The surfaces are provided by a matrix of small bodies shaped to form a pile with each other so there is a high degree of porosity throughout the matrix with small, intricate, complex passages and an extensive total surface area. It should become evident that the matrix definition applies to the structure commonly used in towers to film liquid brought into contact with gas so there will be a thorough mixing of the two to carry out some process objective. The colloquial term is "packing." Packing, then, is the structural feature of unit 10. Many forms and materials for this packing were tested. The structure disclosed here appears, in the laboratory, to hold great promise in controlling the foaming tendencies of Basra production. In the field installation in Iraq the laboratory results were confirmed. The complete control, without chemical, is difficult to obtain mechanically. However, this disclosure was a great leap forward in preventing foam from actually being developed from oil production which has a great tendency to foam.

Unit 10 is, first of all, a framework to hold the packing bodies. It is sometimes referred to as a basket. It is disclosed here as formed of square, rigid angle members welded together to form the basket walls. Screening 15 is attached to the sides of the framework, meshed small enough to retain the packing in place. A suitable support grating 16 is formed as a bottom to the basket. The framework has legs 17 which space the support grating 16 from the bottom of the separator vessel. The resuit is a foraminous container, or retainer, for matrix body 18 which is mounted to hold the body 18 below the inlet 2 so the liquids will be distributed over the large, intricate surface of the packing.

Figure 3:
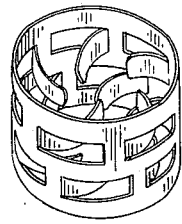
FIG. 3 is a perspective of a single Pall Ring showing the details of its construction.

FIG. 3 is the presently preferred form for the packing bodies of the matrix 18. This is a well-known form generally referred to in the trade as a Pall Ring. The exact origin of this term is obscure, but it is probably related to the name of a packing research engineer who conceived of the form as disclosed in FIG. 3. The Pall Ring is not the only form of packing body which will function under the invention. However, this form does function well and is preferred at this stage of the foam problem solving.

CONCLUSION

The invention obviously centers about the structural embodiment, matrix body 18. Those skilled in the art will readily detect I am having a problem in defining how my invention works in a way satisfactory to me. That the invention does work is undeniable. A dramatic reduction in foaming did take place in Basra when the described embodiment of my invention was substituted for the original centrifugal inlets. But just what forces did I bring into play? That is a question for which I have been seeking an answer in the laboratory. I believe my answer is now satisfactory.

I have considered deflective currents in the interstices provided by the matrix of Pall Rings. Certainly there is a large viscous drag force generated by these fluid currents. This force will absorb the flowing energy of fluids passed through the body. Perhaps it would be better if I described what takes place as a conversion of the flowing energy of the fluids into heat. In any event, the flowing energy is reduced. Less of the energy will be available to shear the gaseous bubbles to produce additional foam.

My laboratory results are a base for an additional explanation. The gaseous bubble which exists in the fluid mixture directed into the separator can be sheared, or divided, by impact upon a surface. I have found one way to avoid this shearing is to contain the bubble as it contacts an impact surface. Perhaps this is a crude statement, but my invention provides a fluid cushion about the bubble as it impacts upon a Pall Ring surface. The interstices of the matrix of Pall Rings, when filled with fluid function as this cushion.

If the size of the Pall Rings and the flow rate of the mixture into their matrix gives an effective, fluid packed, porous body, the bubbles of the mixture will not be significantly sheared. At least my laboratory results lead me to this conclusion. The incoming mixture flows into the matrix of Pall Rings. The flowing energy does not crush, or fragment, the bubbles of the mixture. The fluids in the matrix support the bubble laterally as it makes surface contact. Of course the mixture then passes through the interstices of the Pall Rings and viscous drag absorbs more energy. Overall turbulence of the fluids passed through the matrix is reduced. Shearing of the bubbles of vapor is prevented.

The deenergized liquids can then be described as easing into the body of liquids already in lower portion of the separator. A minimum of foam is additionally formed.

I have also considered the mixture of fluids as they are spread in a relatively thin layer over the surfaces of the Pall Rings. I have contemplated whether the filming of the fluids by this packing provides the short distance of travel needed for disengagement of the gas of the mixture from the liquids. Perhaps this is a result which releases gas without creating additional foam. Viscous drag, lateral fluid support and filming may all play varying parts in avoiding foam formation. It is a difficult answer to lift out of theory. At the moment I have concluded that Pall Rings, in a matrix body, sized to be liquid packed with the fluid mixture flowed into, and through, the body, give the desired result. This answer I have developed is presently satisfactory to me. I believe it to be an adequate guide for reducing the invention to practice.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. An oil and gas separator, including, a shell into which the fluids of an oil well are conducted for separation, an inlet connected through the wall of the shell and sized to conduct the mixture of fluids into the shell, an outlet connected through the upper wall of the shell and remotely spaced from the inlet to conduct separated gas from the shell, an outlet connected through the lower wall of the shell and remotely spaced from the inlet to conduct separated liquids from the shell, a plurality of multi-surfaced packing structures held in a body with a foraminous structure mounted at a fixed location within the shell and below the inlet so as to receive the fluid mixture to liquid pack the interstices of the body, whereby the gaseous bubbles will not be fragmented and additional foam developed as the liquids are deenergized and flow to the lower portion of the shell while the gas separates from the mixture and flows to the upper portion of the shell, and a diverting structure mounted at the inlet formed and arranged to direct the liquid downward over the packing body.

2. The separator of claim 1 in which, the multi-surfaced structures held in a body are in the form of Pall Rings which in the body matrix provide high porosity for the body.

* * * * *